United States Patent
Yuza

(10) Patent No.: US 10,761,296 B2
(45) Date of Patent: Sep. 1, 2020

(54) IMAGING LENS

(71) Applicant: KANTATSU CO., LTD., Yaita-shi, Tochigi (JP)

(72) Inventor: Shingo Yuza, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 35 days.

(21) Appl. No.: 15/876,876

(22) Filed: Jan. 22, 2018

(65) Prior Publication Data
US 2019/0011666 A1 Jan. 10, 2019

(30) Foreign Application Priority Data
Jan. 23, 2017 (JP) .................................. 2017-009878

(51) Int. Cl.
*G02B 9/34* (2006.01)
*G02B 27/00* (2006.01)
(Continued)

(52) U.S. Cl.
CPC ............. *G02B 9/34* (2013.01); *G02B 13/004* (2013.01); *G02B 13/22* (2013.01); *G02B 27/0037* (2013.01)

(58) Field of Classification Search
CPC .... G02B 13/22; G02B 27/0037; G02B 13/06; G02B 13/18; G02B 3/00; G02B 3/02; G02B 3/04; G02B 3/06; G02B 3/08; G02B 9/00; G02B 9/02; G02B 9/04; G02B 9/06; G02B 9/08; G02B 9/10; G02B 9/12; G02B 9/14; G02B 9/16; G02B 9/18; G02B 9/20; G02B 9/22; G02B 9/24; G02B 9/26; G02B 9/28;
(Continued)

(56) References Cited

U.S. PATENT DOCUMENTS 8,908,291 B1 12/2014 Chung et al.
2004/0218285 A1 11/2004 Amanai
(Continued)

FOREIGN PATENT DOCUMENTS

CN 1834717 A 9/2006
CN 1892279 A 1/2007
(Continued)

*Primary Examiner* — William R Alexander
*Assistant Examiner* — Henry A Duong
(74) *Attorney, Agent, or Firm* — Oliff PLC

(57) ABSTRACT

There is provided an imaging lens which is compact and corresponds to wide field of view, and achieves excellent optical performance. An imaging lens comprises in order from an object side to an image side, a first lens having a convex surface facing an image side and positive refractive power, a second lens having a concave surface facing the image side near an optical axis and negative refractive power, a third lens having the convex surface facing the image side and the positive refractive power, and a fourth lens being a meniscus lens having the convex surface facing an object side near the optical axis and having the negative refractive power, wherein said fourth lens is a double-sided aspheric lens and has a pole point at an off-axial position on the image-side surface, and a below conditional expression (1) is satisfied:

$$0.5 < \Sigma d/TTL < 0.9 \qquad (1)$$

where
$\Sigma d$: distance along the optical axis from an object-side surface of the first lens to an image-side surface of the fourth lens, and
TTL: total track length.

18 Claims, 7 Drawing Sheets

(51) Int. Cl.
*G02B 13/22* (2006.01)
*G02B 13/00* (2006.01)

(58) Field of Classification Search
CPC ... G02B 9/30; G02B 9/32; G02B 9/34; G02B 9/36; G02B 9/38; G02B 9/40; G02B 9/42; G02B 9/46; G02B 9/48; G02B 9/50; G02B 9/52; G02B 9/54; G02B 9/56; G02B 9/58; G02B 9/60; G02B 9/62; G02B 9/64; G02B 13/00; G02B 13/002; G02B 13/004; G02B 13/0045; G02B 9/44–56
USPC .......................................................... 359/715
See application file for complete search history.

(56) References Cited

U.S. PATENT DOCUMENTS

| | | |
|---|---|---|
| 2009/0207506 A1 | 8/2009 | Tang et al. |
| 2011/0261470 A1 | 10/2011 | Chen et al. |
| 2012/0044403 A1 | 2/2012 | Tang et al. |
| 2012/0062782 A1 | 3/2012 | Huang |
| 2012/0063012 A1 | 3/2012 | Lee et al. |
| 2013/0141633 A1 | 6/2013 | Tang et al. |
| 2015/0124149 A1 | 5/2015 | Tang et al. |
| 2017/0219799 A1* | 8/2017 | Hsueh ..................... G02B 9/34 |
| 2018/0095244 A1* | 4/2018 | Lin ....................... G02B 13/004 |
| 2018/0120542 A1* | 5/2018 | Chang ................... G02B 5/208 |

FOREIGN PATENT DOCUMENTS

| | | |
|---|---|---|
| CN | 102253470 A | 11/2011 |
| CN | 202177732 U | 3/2012 |
| CN | 102401977 A | 4/2012 |
| CN | 102401982 A | 4/2012 |
| CN | 202256841 U | 5/2012 |
| CN | 102540410 A | 7/2012 |
| CN | 202443162 U | 9/2012 |
| CN | 202583577 U | 12/2012 |
| CN | 202583578 U | 12/2012 |
| CN | 102902044 A | 1/2013 |
| CN | 103135203 A | 6/2013 |
| CN | 203385928 U | 1/2014 |
| CN | 203643674 U | 6/2014 |
| CN | 104142557 A | 11/2014 |
| CN | 104730685 A | 6/2015 |
| CN | 104730686 A | 6/2015 |
| EP | 2090914 A1 | 8/2009 |
| JP | 2011-095301 A | 5/2011 |
| JP | 2012068292 A | 4/2012 |
| JP | 2012-252193 A | 12/2012 |
| KR | 20040060621 A | 7/2004 |
| TW | 201403119 A | 1/2014 |
| TW | 201403164 A | 1/2014 |
| TW | 201432340 A | 8/2014 |

* cited by examiner

IMAGING LENS

The present application is based on and claims priority of Japanese patent application No. 2017-009878 filed on Jan. 23, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in a home appliance and information terminal equipment, and demand is more increased. The imaging lens mounted in such equipment is required to be compact, to make it possible to take a picture in a wide range and to have high resolution performance for correcting aberration over an image plane with high accuracy.

In order to obtain the high resolution performance over the image plane, the aberrations should be corrected with high accuracy, and moreover, it becomes important to secure telecentricity of an image side. If the telecentricity of the image side is not sufficiently secured, chief ray angle (namely, CPA) to the image sensor becomes large and problems are occurred such as shading and deficiency in light quantity at a peripheral area. Accordingly, deterioration in image quality is caused.

So far, various aspects of the imaging lens, such as performance, F-number, field of view and so on have been proposed according to purpose of use and required performance. Especially, many proposals have been made for the imaging lens comprising four lenses, because the aberrations are excellently corrected and it is effective to reduce size and cost.

Patent Document 1 (JP2011-095301A) discloses an imaging lens comprising, in order from an object side, a first lens having positive refractive power and a convex surface facing an object side, a second lens having negative refractive power and a concave surface facing an image side, a third lens having the positive refractive power, and a fourth lens having the negative refractive power and a concave surface facing the image side, wherein at least an image-side surface of the fourth lens is formed as an aspheric surface.

Patent Document 2 (US2013/0141633A) discloses an imaging lens comprising, in order from an object side, a first lens having a convex surface facing the object side and the positive refractive power, a second lens having the negative refractive power, the third lens made of plastic material, and having the convex surface facing the image side and the positive refractive power, and the fourth lens made of plastic material, and having biconcave shape and the negative refractive power, wherein the image-side surface of the fourth lens changes from the concave surface to the convex surface at a peripheral area.

SUMMARY OF THE INVENTION

According to the imaging lens disclosed in the above Patent Document 1, CRA at maximum field of view is 27° or less, and telecentricity of the image side is relatively secured. However, the field of view is narrow such as 54° to 68°. Furthermore, distortion is large and it is not possible to correct aberrations over an image plane with high accuracy. If attempt is made to realize further wide field of view, it becomes very difficult to secure the telecentricity of the image side and correct aberration at a peripheral area.

The imaging lens disclosed in the above Patent Document 2 secures photographing field of view of 75°. However, the CRA at maximum field of view is more than 35° in many cases, and the problems such as shading and deficiency in light quantity at the peripheral area still remain. In some cases, the CRA at maximum field of view is reduced to 28° or the like, however, astigmatism and distortion become large and it is not possible to obtain excellent optical performance.

The present invention has been made in view of the above problems, and an object of the present invention is to provide an imaging lens with high resolution performance, which is compact, corresponds to a wide field of view, and corrects aberration over an image plane with high accuracy.

Regarding terms used in the present invention, a convex surface or a concave surface of the lens implies a shape near the optical axis (paraxial portion), and unless otherwise noted, refractive power implies the refractive power near the optical axis (paraxial portion). A pole point implies an off-axial point on an aspheric surface at which a tangential plane intersects the optical axis perpendicularly. Total track length is defined as a distance along the optical axis from an object-side surface of an optical element arranged closest to the object side to an image plane. When measurement of total track length is made, thickness of an IR cut filter or a cover glass arranged between the imaging lens and a sensor is regarded as an air.

An imaging lens according to the present invention comprises a first lens having a convex surface facing an image side and positive refractive power, a second lens having a concave surface facing the image side near an optical axis and negative refractive power, a third lens having the convex surface facing the image side and the positive refractive power, and a fourth lens being a meniscus lens having the convex surface facing an object side near the optical axis and having the negative refractive power, wherein the fourth lens is a double-sided aspheric lens, and has a pole point at an off-axial position on the image-side surface, and a below conditional expression (1) is satisfied:

$$0.5 < \Sigma d/TTL < 0.9 \qquad (1)$$

where
$\Sigma d$: distance along the optical axis from the object-side surface of the first lens to the image-side surface of the fourth lens, and
TTL: total track length.

The first lens prevents from occurrence of aberrations and achieves reduction of a size and wide field of view of the imaging lens.

The second lens excellently corrects spherical aberration, chromatic aberration and coma aberration occurred at the first lens.

The third lens has the largest positive refractive power among the lenses thereof, and therefore, achieves reduction of a size and wide field of view of the imaging lens, and excellently corrects astigmatism, the coma aberration and field curvature. By having the convex surface facing the image side, the third lens guides off-axial light ray passing through the third lens to the fourth lens almost in parallel with the optical axis. Thereby, CRA at maximum field of view is reduced.

The fourth lens secures back focus while maintaining compact side of the imaging lens. By forming the image-side surface as the aspheric surface having the pole point, the fourth lens suppresses astigmatic difference and corrects the astigmatism, moreover, corrects the distortion, the coma aberration and the field curvature, and controls the CRA over the image plane. Furthermore, if the object-side surface is also formed as the aspheric surface having the pole point, correction of the aberrations and control of the CRA become more excellent.

The conditional expression (1) defines an appropriate scope of the back focus to the total track length. By satisfying the conditional expression (1), an appropriate back focus is secured while keeping a thickness of producible lens.

According to the imaging lens having the above structure, it is preferable that an aperture stop is arranged at the object side of the first lens.

By arranging the aperture stop at the object side of the first lens, an entrance pupil position is away from the image plane and it becomes easy to control the telecentricity.

According to the imaging lens having the above structure, it is preferable to satisfy a below conditional expression (2):

$$0.7<|r5|/f<3.5 \tag{2}$$

where
r5: curvature radius near the optical axis of the object-side surface of the third lens, and
f: focal length of the overall optical system.

The conditional expression (2) defines a shape of the object-side surface of the third lens near the optical axis. By satisfying the conditional expression (2), the aberrations are excellently corrected while achieving reduction of size and wide field of view of the imaging lens.

Regarding the conditional expression (2), a below conditional expression (2a) is more preferable:

$$1.0<|r5|/f<3.0 \tag{2a}$$

According to the imaging lens having the above structure, it is preferable to satisfy a below conditional expression (3):

$$1.0<f1/f \tag{3}$$

where
f1: focal length of the first lens, and
f: focal length of the overall optical system.

The conditional expression (3) defines the focal length of the first lens to the focal length of the overall optical system. By satisfying the conditional expression (3), the wide field of view is achieved while preventing occurrence of the spherical aberration.

Regarding the conditional expression (3), a below conditional expression (3a) is more preferable:

$$1.0<f1/f<2.0 \tag{3a}$$

According to the imaging lens having the above structure, it is preferable to satisfy a below conditional expression (4):

$$30<vd1-vd2 \tag{4}$$

where
vd1: abbe number at d-ray of the first lens, and
vd2: abbe number at d-ray of the second lens.

The conditional expression (4) defines relationship between the abbe numbers at d-ray of the first lens and the second lens, and is a condition for excellently correcting the chromatic aberration. When the value is above the lower limit of the conditional expression (4), the chromatic aberration is excellently corrected.

Regarding the conditional expression (4), a below conditional expression (4a) is more preferable:

$$30<vd1-vd2<40 \tag{4a}$$

According to the imaging lens having the above structure, it is preferable to satisfy a below conditional expression (5):

$$20<vd4<32 \tag{5}$$

where
vd4: abbe number at d-ray of the fourth lens.

The conditional expression (5) defines the abbe number at d-ray of the fourth lens. By satisfying the conditional expression (5), the chromatic aberration is excellently corrected.

According to the imaging lens having the above structure, it is preferable that the object-side surface of the first lens is a concave surface.

By applying the concave surface to the object-side surface of the first lens, the focal length of the overall optical system of the imaging lens is shortened, and the wide field of view is realized.

According to the imaging lens having the above structure, it is preferable to satisfy a below conditional expression (6):

$$0.5<(T3/f)\times100<2.0 \tag{6}$$

where
T3: distance along the optical axis from the image-side surface of the third lens to the object-side surface of the fourth lens, and
f: focal length of the overall optical system.

The conditional expression (6) defines an appropriate scope of the distance along the optical axis from the image-side surface of the third lens to the object-side surface of the fourth lens. By satisfying the conditional expression (6), the total length of the imaging lens is shortened, light ray incident to the fourth lens is made appropriate, and it becomes easy to control the CRA.

Regarding the conditional expression (6), a below conditional expression (6a) is more preferable:

$$0.9<(T3/f)\times100<1.5 \tag{6a}$$

According to the imaging lens having the above structure, it is preferable to satisfy a below conditional expression (7):

$$1.0<|r3/r4|<4.2 \tag{7}$$

where
r3: curvature radius near the optical axis of the object-side surface of the second lens, and
r4: curvature radius near the optical axis of the image-side surface of the second lens.

The conditional expression (7) defines a shape of the second lens near the optical axis. By satisfying the conditional expression (7), the spherical aberration and axial chromatic aberration occurred at the first lens are excellently corrected.

Regarding the conditional expression (7), a below conditional expression (7a) is more preferable:

$$1.0<|r3/r4|<2.4 \tag{7a}$$

According to the imaging lens having the above structure, it is preferable to satisfy a below conditional expression (8):

$$0.3<D3/f<0.9 \tag{8}$$

where
D3: thickness on the optical axis of the third lens, and
f: focal length of the overall optical system.

The conditional expression (8) defines a ratio of the thickness on the optical axis of the third lens and the focal length of the overall optical system. By satisfying the conditional expression (8), formability of the third lens is excellently maintained and reduction of size of the imaging lens is achieved. The third lens guides off-axial light ray passing through the third lens to the fourth lens almost in parallel with the optical axis and the CRA is reduced.

Regarding the conditional expression (8), a below conditional expression (8a) is more preferable:

$$0.5<D3/f<0.9 \tag{8a}$$

According to the imaging lens having the above structure, it is preferable to satisfy a below conditional expression (9):

$$f4/f<0.8 \tag{9}$$

where
f4: focal length of the fourth lens, and
f: focal length of the overall optical system.

The conditional expression (9) defines the focal length of the fourth lens to the focal length of the overall optical system of the imaging lens. When the value is below the upper limit of the conditional expression (9), the distortion is excellently corrected and an appropriate back focus is secured.

Regarding the conditional expression (9), a below conditional expression (9a) is more preferable:

$$-1.7<f4/f<-1.0 \tag{9a}$$

According to the imaging lens having the above structure, it is preferable to satisfy a below conditional expression (10):

$$-1.4<r2/f<-0.2 \tag{10}$$

where
r2: curvature radius near the optical axis of the image-side surface of the first lens, and
f: focal length of the overall optical system.

The conditional expression (10) defines a shape of the image-side surface near the optical axis of the first lens. By satisfying the conditional expression (10), refractive power of the first lens is appropriately controlled, occurrence of aberrations is prevented, and the imaging lens becomes compact and wide field of view is achieved.

Regarding the conditional expression (10), a below conditional expression (10a) is more preferable:

$$-0.7<r2/f<-0.3 \tag{10a}$$

According to the imaging lens having the above structure, it is preferable to satisfy a below conditional expression (11):

$$8.0<D3/T2 \tag{11}$$

where
D3: thickness on the optical axis of the third lens, and
T2: distance along the optical axis from the image-side surface of the second lens to the object-side surface of the third lens.

The conditional expression (11) defines a ratio of the thickness on the optical axis of the third lens and the distance along the optical axis from the image-side surface of the second lens to the object-side surface of the third lens. By satisfying the conditional expression (11), the third lens is arranged at an optimum position with an appropriate thickness, and the distortion is prevented from being large. Accordingly, the distortion of the fourth lens is effectively corrected.

Regarding the conditional expression (11), a below conditional expression (11a) is more preferable:

$$8.0<D3/T2<25.0 \tag{11a}$$

According to the imaging lens having the above structure, it is preferable to satisfy a below conditional expression (12):

$$-8.5<|r5|/r6<3.0 \tag{12}$$

where
r5: curvature radius near the optical axis of the object-side surface of the third lens, and
r6: curvature radius near the optical axis of the image-side surface of the third lens.

The conditional expression (12) defines a shape of the third lens near the optical axis. By satisfying the conditional expression (12), it becomes easy to correct the astigmatism and the field curvature while achieving reduction of size and the wide field of view of the imaging lens.

Regarding the conditional expression (12), a below conditional expression (12a) is more preferable:

$$-8.0<|r5|/r6<-3.5 \tag{12a}$$

According to the imaging lens having the above structure, it is preferable to satisfy a below conditional expression (13):

$$0.45<r4/f<4.0 \tag{13}$$

where
r4: curvature radius near the optical axis of the image-side surface of the second lens, and
f: focal length of the overall optical system.

The conditional expression (13) defines a shape of the image-side surface of the second lens near the optical axis. By satisfying the conditional expression (13), the axial chromatic aberration is excellently corrected.

Regarding the conditional expression (13), a below conditional expression (13a) is more preferable:

$$0.45<r4/f<2.5 \tag{13a}$$

According to the imaging lens having the above structure, it is preferable to satisfy a below conditional expression (14):

$$0.2<(r7+r8)/(r7-r8)<4.0 \tag{14}$$

where
r7: curvature radius near the optical axis of the object-side surface of the fourth lens, and
r8: curvature radius near the optical axis of the image-side surface of the fourth lens.

The conditional expression (14) defines a shape of the fourth lens near the optical axis. By satisfying the conditional expression (14), it becomes easy to correct the coma aberration and the field curvature at the peripheral area, and the astigmatism is prevented from being large.

Regarding the conditional expression (14), a below conditional expression (14a) is more preferable:

$$1.5<(r7+r8)/(r7-r8)<4.0 \tag{14a}$$

According to the imaging lens having the above structure, it is preferable to satisfy a below conditional expression (15):

$$-1.2<r2/|r3|<-0.1 \tag{15}$$

where
r2: curvature radius near the optical axis of the image-side surface of the first lens, and r3: curvature radius near the optical axis of the object-side surface of the second lens.

The conditional expression (15) defines a ratio of the curvature radius near the optical axis of the image-side surface of the first lens, and the curvature radius near the optical axis of the object-side surface of the second lens. By satisfying the conditional expression (15), it becomes easy to correct the chromatic aberration, the astigmatism and the coma aberration.

Regarding the conditional expression (15), a below conditional expression (15a) is more preferable:

$$-0.8 < r2/|r3| < -0.1 \tag{15a}$$

According to the imaging lens having the above structure, it is preferable to satisfy a below conditional expression (16):

$$2.5 < (T2/f) \times 100 < 9.0 \tag{16}$$

where
T2: distance along the optical axis from the image-side surface of the second lens to the object-side surface of the third lens, and
f: focal length of the overall optical system.

The conditional expression (16) defines an appropriate scope of the distance along the optical axis from the image-side surface of the second lens to the object-side surface of the third lens. By satisfying the conditional expression (16), the total length of the imaging lens is prevented being excessively large, a distance between the second lens and the third lens is appropriately secured, and thereby it enables aberrations to be excellently corrected.

Regarding the conditional expression (16), a below conditional expression (16a) is more preferable:

$$2.5 < (T2/f) \times 100 < 8.0 \tag{16a}$$

According to the imaging lens having the above structure, it is preferable to satisfy a below conditional expression (17):

$$0.2 < r7/f < 2.0 \tag{17}$$

where
r7: curvature radius near the optical axis of the object-side surface of the fourth lens, and
f: focal length of the overall optical system.

The conditional expression (17) defines a shape of the object-side surface of the fourth lens near the optical axis. By satisfying the conditional expression (17), the distortion is excellently corrected and an appropriate back focus is secured.

Regarding the conditional expression (17), a below conditional expression (17a) is more preferable:

$$0.2 < r7/f < 1.2 \tag{17a}$$

According to the imaging lens having the above structure, it is preferable to satisfy a below conditional expression (18):

$$0.9 < f1/f3 < 2.0 \tag{18}$$

where
f1: focal length of the first lens, and
f3: focal length of the third lens.

The conditional expression (18) defines a ratio of the focal length of the first lens and the focal length of the third lens. By satisfying the conditional expression (18), the coma aberration, the astigmatism and the field curvature are excellently corrected while achieving reduction of size and the wide field of view of the imaging lens.

Regarding the conditional expression (18), a below conditional expression (18a) is more preferable:

$$1.3 < f1/f3 < 2.0 \tag{18a}$$

According to the imaging lens having the above structure, it is preferable to satisfy a below conditional expression (19):

$$1.6 < TTL/f < 3.0 \tag{19}$$

where
TTL: total track length, and
f: focal length of the overall optical system.

The conditional expression (19) defines the total track length to the focal length of an overall optical system of the imaging lens. By satisfying the conditional expression (19), it becomes easy to suppress the total track length while securing the back focus.

Regarding the conditional expression (19), a below conditional expression (19a) is more preferable:

$$1.8 < TTL/f < 2.2 \tag{19a}$$

According to the imaging lens having the above structure, it is preferable to satisfy a below conditional expression (20):

$$-0.5 < L3Rsag/ED6 < -0.1 \tag{20}$$

where
L3Rsag: sag amount at an effective diameter edge of the image-side surface of the third lens, and
ED6: an effective diameter of the image-side surface of the third lens.

The conditional expression (20) defines an appropriate scope of the Sag amount at an effective diameter edge to the effective diameter of the image-side surface of the third lens. By satisfying the conditional expression (20), the astigmatism, the coma aberration and the field curvature are excellently corrected. The light ray passing through the third lens enters the fourth lens almost in parallel with the optical axis, and it becomes easy to reduce the CRA at maximum field of view.

Regarding the conditional expression (20), a below conditional expression (20a) is more preferable:

$$-0.4 < L3Rsag/ED6 < -0.2 \tag{20a}$$

According to the imaging lens having the above structure, it is preferable that the image-side surface of the second lens is formed as the aspheric surface having the pole point at the off-axial position.

By having the pole point at the off-axial position of the image-side surface of the second lens, the astigmatism, the coma aberration and chromatic aberration of magnification are effectively corrected.

According to the imaging lens having the above structure, it is preferable to satisfy a below conditional expression (21) regarding the CRA at the maximum field of view:

$$CRA < 32° \tag{21}$$

The conditional expression (21) defines the chief ray angle to the image sensor at the maximum field of view. By satisfying the conditional expression (21), pencil of rays is effectively guided to each pixel of the image sensor, and shading occurred at the image sensor is reduced.

Regarding the conditional expression (21), a below conditional expression (21a) is more referable:

$$CRA < 27° \tag{21a}$$

Effect of Invention

According to the present invention, there can be provided an imaging lens which is compact and corresponds to the wide field of view, and achieves excellent optical performance.

DETAILED DESCRIPTION OF THE PREFERRED EMBODIMENT

Hereinafter, the preferred embodiment of the present invention will be described in detail referring to the accompanying drawings.

Figure 1:
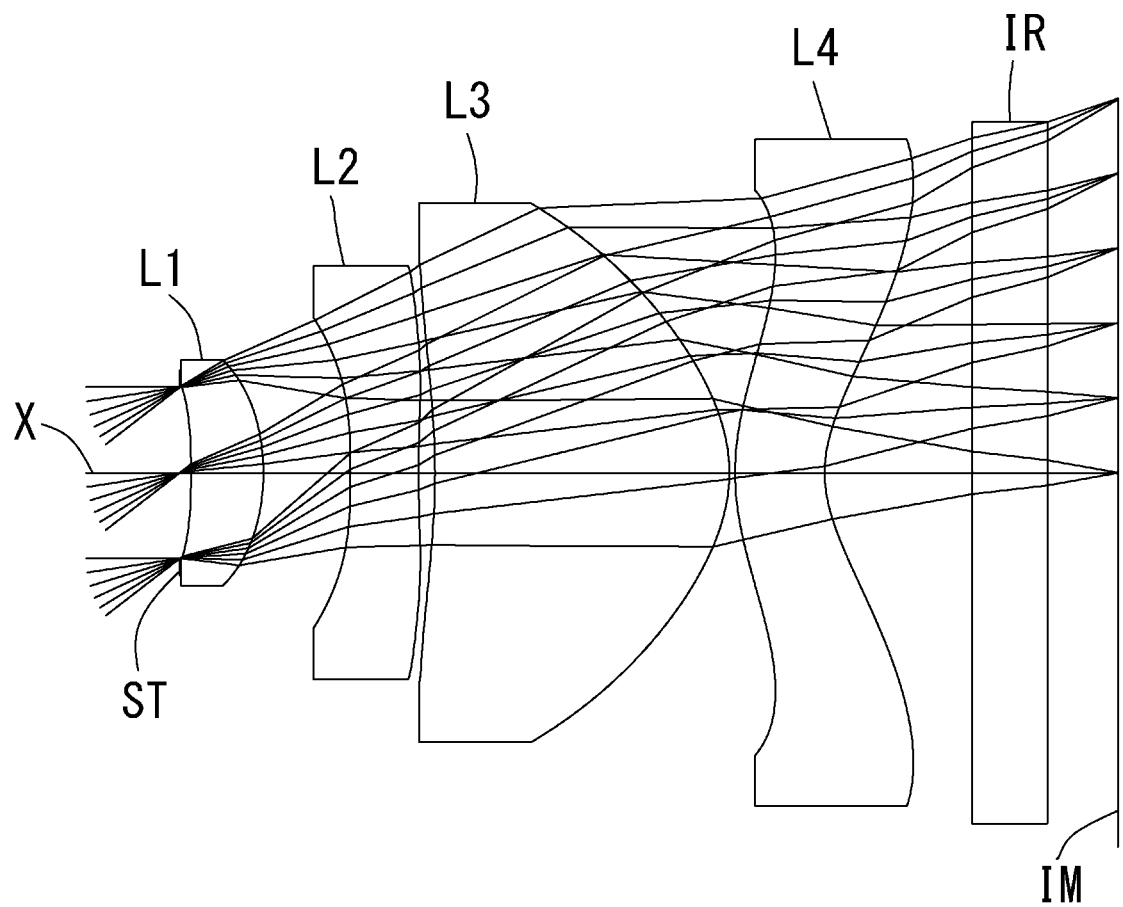
FIG. 1 is a schematic view showing a general configuration of an imaging lens in Example 1 according to the present invention.
Figure 3:
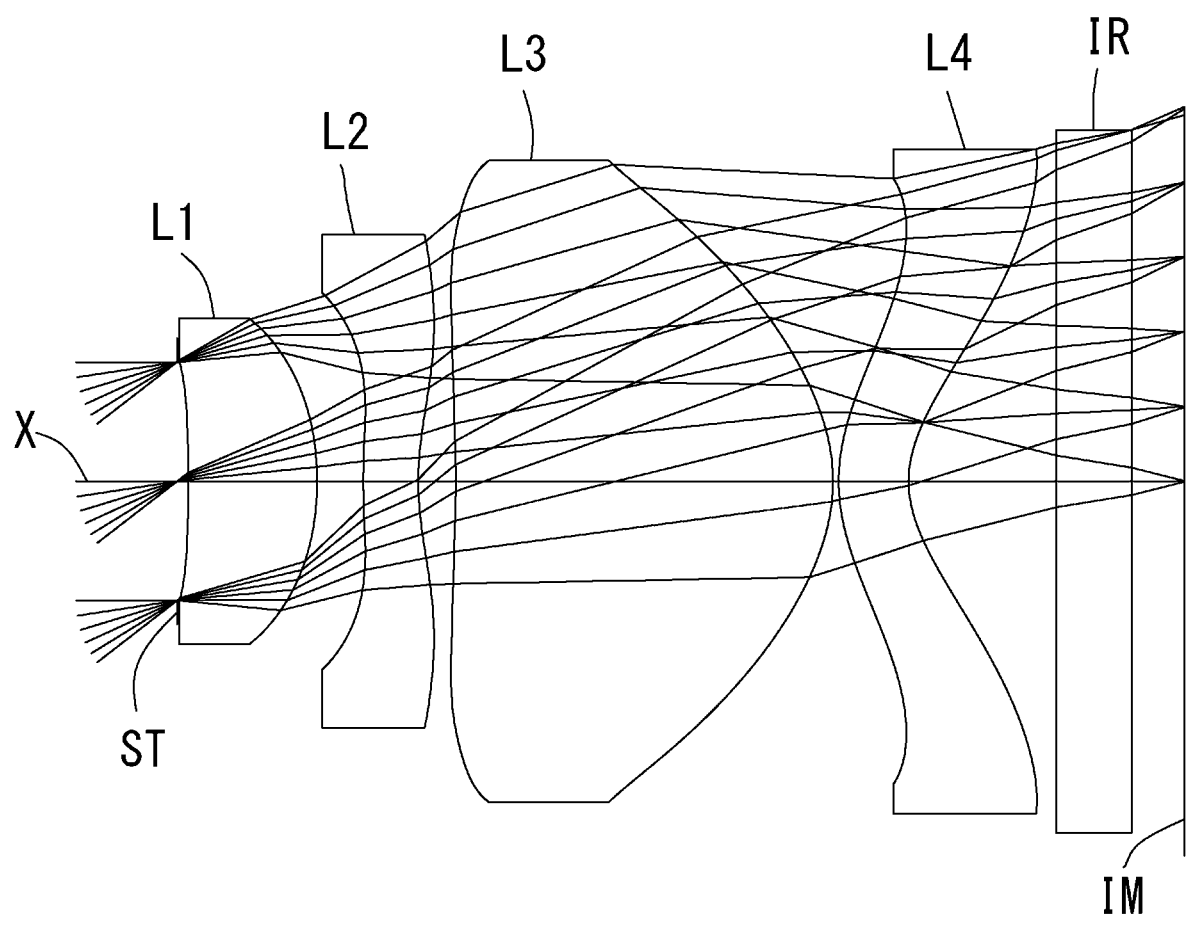
FIG. 3 is a schematic view showing the general configuration of an imaging lens in Example 2 according to the present invention.
Figure 5:
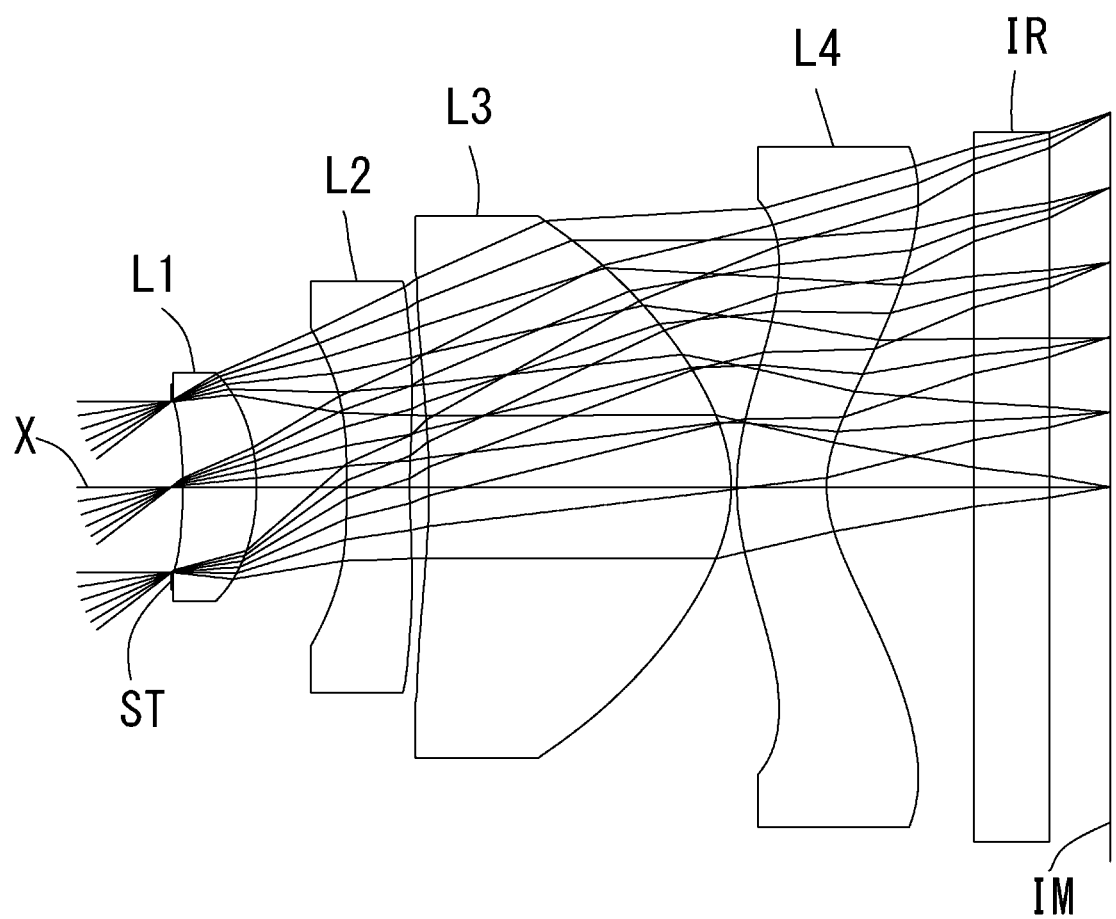
FIG. 5 is a schematic view showing the general configuration of an imaging lens in Example 3 according to the present invention.

FIGS. 1, 3 and 5 are schematic views showing the general configurations of the imaging lenses in Examples 1 to 3 according to the embodiments of the present invention, respectively. Since all these examples have the same basic lens configuration, the general configuration of an imaging lens according to this embodiment is explained below mainly referring to the schematic view of Example 1.

As shown in FIG. 1, the imaging lens according to this embodiment comprises in order from an object side to an image side, a first lens L1 having a convex surface facing an image side and positive refractive power, a second lens L2 having a concave surface facing the image side near an optical axis X and negative refractive power, a third lens L3 having a convex surface facing the image side and positive refractive power, and a fourth lens L4 being a meniscus lens having the convex surface facing an object side near the optical axis X and having the negative refractive power. The fourth lens L4 is a double-sided aspheric lens and has a pole point at an off-axial position on the image-side surface. In the present embodiment, an aperture stop ST is arranged in front of the first lens L1 having the positive refractive power. Therefore, total track length TTL according to the present embodiment becomes a distance along the optical axis X from the aperture stop ST to the image plane IM (filter IR is regarded as an air).

A filter IR such as an IR cut filter and a cover glass is arranged between the fourth lens L4 and the image plane IM. The filter IR is omissible.

The first lens L1 has the convex surface facing the image side and the positive refractive power, and prevents occurrence of aberrations and achieves reduction of size and wide field of view of the imaging lens. The first lens L1 is a meniscus lens having the concave surface facing the object side near the optical axis X and the convex surface facing the image side.

The second lens L2 has the concave surface facing the image side near the optical axis X and the negative refractive power, and excellently corrects spherical aberration, chromatic aberration and coma aberration occurred at the first lens L1. A shape of the second lens L2 may be biconcave shape having the concave surfaces facing the object side and the image side near the optical axis X, or the meniscus shape having the convex surface facing the object side and the concave surface facing the image side near the optical axis X. The Example 1 in FIG. 1 and the Example 3 in FIG. 5 are examples showing biconcave shape of the second lens L2. In these cases, the second lens L2 excellently corrects the spherical aberration occurred at the first lens L1 and also favorably corrects the astigmatism.

The third lens L3 has the convex surface facing the image side and the large positive refractive power, and excellently corrects the astigmatism, the coma aberration and the field curvature while achieving reduction of size and wide field of view of the imaging lens. The third lens L3 is a meniscus lens having the concave surface facing the object side and the convex surface facing the image side near the optical axis x. The convex surface facing the image side guides an off-axial light ray passing through the third lens L3 to the fourth lens L4 almost in parallel with the optical axis X, and CRA at maximum field of view is reduced.

The fourth lens L4 is a meniscus lens having the convex surface facing the object side and the negative refractive power, and secures back focus while maintaining compact side of the imaging lens. An aspheric surface of the image-side surface having a pole point suppresses astigmatic difference and corrects the astigmatism, and corrects the distortion, the coma aberration and the field curvature. The object-side surface is also formed as the aspheric surface having the pole point, and it makes possible to excellently correct these aberrations and control the CRA.

An aperture stop ST is arranged at the object side more than the first lens. Therefore, an entrance pupil position is away from the image plane IM and it becomes easy to control the telecentricity.

The imaging lens according to the present embodiments facilitates manufacture by using plastic materials to all of the lenses, and realizes mass production in a low cost. Additionally, both surfaces of all of the lenses are made as proper aspheric surfaces, and the aberrations are favorably corrected.

The material applied to the lens is not limited to the plastic material. By using glass material, further high performance may be aimed. All of surfaces of lenses are preferably formed as aspheric surfaces, however, spherical surfaces may be adopted which is easy to manufacture in accordance with required performance.

The imaging lens according to the present embodiments shows preferable effect by satisfying the below conditional expressions (1) to (21).

$$0.5 < \Sigma d/TTL < 0.9 \quad (1)$$

$$0.7 < |r5|/f < 3.5 \quad (2)$$

$$1.0 < f1/f \quad (3)$$

$$30 < vd1 - vd2 \quad (4)$$

$$20 < vd4 < 32 \quad (5)$$

$$0.5 < (T3/f) \times 100 < 2.0 \quad (6)$$

$$1.0 < |r3/r4| < 4.2 \quad (7)$$

$$0.3 < D3/f < 0.9 \quad (8)$$

$$f4/f < 0.8 \quad (9)$$

$$-1.4 < r2/f < -0.2 \quad (10)$$

$$8.0 < D3/T2 \quad (11)$$

$$-8.5 < |r5|/r6 < 3.0 \quad (12)$$

$$0.45 < r4/f < 4.0 \quad (13)$$

$$0.2 < (r7+r8)/(r7-r8) < 4.0 \quad (14)$$

$$-1.2 < r2/|r3| < -0.1 \quad (15)$$

$$2.5 < (T2/f) \times 100 < 9.0 \quad (16)$$

$$0.2 < r7/f < 2.0 \quad (17)$$

$$0.9 < f1/f3 < 2.0 \quad (18)$$

$$1.6 < TTL/f < 3.0 \quad (19)$$

$$-0.5 < L3Rsag/ED6 < -0.1 \quad (20)$$

$$CRA < 32° \quad (21)$$

where $\Sigma d$: distance along the optical axis X from an object-side surface of the first lens L1 to an image-side surface of the fourth lens L4, TTL: total track length, r5: curvature radius near the optical axis X of the object-side surface of the third lens L3, f1: focal length of the first lens L1, f: focal length of the overall optical system, vd1: abbe number at d-ray of the first lens L1, vd2: abbe number at d-ray of the second lens L2, vd4: abbe number at d-ray of a fourth lens L4, T3: distance along the optical axis X from the image-side surface of the third lens L3 to the object-side surface of the fourth lens L4, r3: curvature radius near the optical axis X of the object-side surface of the second lens L2, r4: curvature radius near the optical axis X of the image-side surface of the second lens L2, D3: thickness on the optical axis X of the third lens L3, f4: focal length of the fourth lens L4, r2: curvature radius near the optical axis X of the image-side surface of the first lens L1, T2: distance along the optical axis X from the image-side surface of the second lens L2 to the object-side surface of the third lens L3, r5: curvature radius near the optical axis X of the object-side surface of the third lens L3, r6: curvature radius near the optical axis X of the image-side surface of the third lens L3, r7: curvature radius near the optical axis of the object-side surface of the fourth lens L4, r8: curvature radius near the optical axis of the image-side surface of the fourth lens L4, f3: focal length of the third lens L3, L3Rsag: sag amount at an effective diameter edge of the image-side surface of the third lens L3, ED6: an effective diameter of the image-side surface of the third lens L3, and CRA: chief ray angle at the maximum field of view.

Regarding the imaging lens according to the present embodiments, it is preferable to satisfy all of conditional expressions. By satisfying the conditional expression individually, operational advantage corresponding to each conditional expression can be obtained.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + \quad \text{Equation 1}$$

$$A_8 H^8 + A_{10} H^{10} + A_{12} H^{12} + A_{14} H^{14} + A_{16} H^{16}$$

Next, examples of the imaging lens according to this embodiment will be explained. In each example, f denotes the focal length of the overall optical system of the imaging lens, Fno denotes an F-number, w denotes a half field of view, ih denotes a maximum image height, and TTL denotes the total track length. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

Example1
Unit mm
f = 4.30
Fno = 2.8
ω(°) = 37.7
ih = 3.30
TTL = 8.04

Surface Data

| Surface Number i | Curvature Radius r | Surface Distance d | Refractive Index Nd | Abbe Number νd |
|---|---|---|---|---|
| (Object) | Infinity | Infinity | | |
| 1 (Stop) | Infinity | 0.1000 | | |
| 2* | −5.9456 | 0.6355 | 1.544 | 55.57 (vd1) |
| 3* | −1.9325 | 0.7677 | | |
| 4* | −10.0578 | 0.5982 | 1.650 | 21.54 (vd2) |
| 5* | 7.5808 | 0.1471 | | |
| 6* | −5.7428 | 2.5942 | 1.535 | 55.66 |
| 7* | −1.4113 | 0.0500 | | |
| 8* | 2.1620 | 0.7895 | 1.650 | 21.54 (vd4) |
| 9* | 1.1077 | 1.3000 | | |
| 10 | Infinity | 0.6650 | 1.517 | 64.17 |
| 11 | Infinity | 0.6273 | | |
| Image Plane | Infinity | | | |

Constituent Lens Data

| Lens | Start Surface | Focal Length | | |
|---|---|---|---|---|
| 1 | 2 | 4.99 | Σd = 5.58 | |
| 2 | 4 | −6.56 | L3Rsag = −1.68 | |
| 3 | 6 | 2.89 | ED6 = 4.67 | |
| 4 | 8 | −4.96 | | |

Aspheric Surface Data

| | Second Surface | Third Surface | Fourth Surface | Fifth Surface |
|---|---|---|---|---|
| k | 0.000000E+00 | 3.973568E−02 | 0.000000E+00 | 5.534241E+00 |
| A4 | −7.425817E−02 | −6.541126E−02 | −1.234928E−01 | −7.817030E−02 |
| A6 | −6.151775E−02 | −6.988512E−03 | 3.617031E−02 | 2.680906E−02 |
| A8 | −3.902822E−02 | 1.208546E−03 | 4.814081E−04 | −6.571213E−03 |
| A10 | 3.493176E−01 | 2.589828E−03 | −4.439204E−04 | 1.915016E−03 |
| A12 | −7.208485E−01 | −2.811625E−02 | −1.267462E−03 | −4.090292E−04 |
| A14 | 4.370831E−01 | 1.448336E−02 | 3.280395E−04 | 2.632294E−05 |
| A16 | 0.000000E+00 | 0.000000E+00 | 0.000000E+00 | 0.000000E+00 |

| | Sixth Surface | Seventh Surface | Eighth Surface | Ninth Surface |
|---|---|---|---|---|
| k | 0.000000E+00 | −9.172340E−01 | −6.751150E+00 | −3.367050E+00 |
| A4 | 4.301271E−02 | 4.351251E−02 | −1.757950E−03 | −1.883674E−02 |
| A6 | −2.677901E−02 | −1.240947E−02 | −5.110627E−03 | 1.650480E−03 |
| A8 | 1.110481E−02 | 2.186816E−03 | 9.838670E−04 | −1.167193E−05 |
| A10 | −2.317089E−03 | −1.719243E−04 | −7.849622E−05 | −1.499830E−05 |
| A12 | 2.334286E−04 | −1.061003E−05 | −9.250147E−07 | 9.968423E−07 |
| A14 | −1.303587E−05 | 1.837264E−06 | 1.311922E−07 | −1.327252E−08 |
| A16 | 0.000000E+00 | 0.000000E+00 | 0.000000E+00 | 0.000000E+00 |

The imaging lens in Example 1 satisfies conditional expressions (1) to (21) as shown in Table 4.

Figure 2:
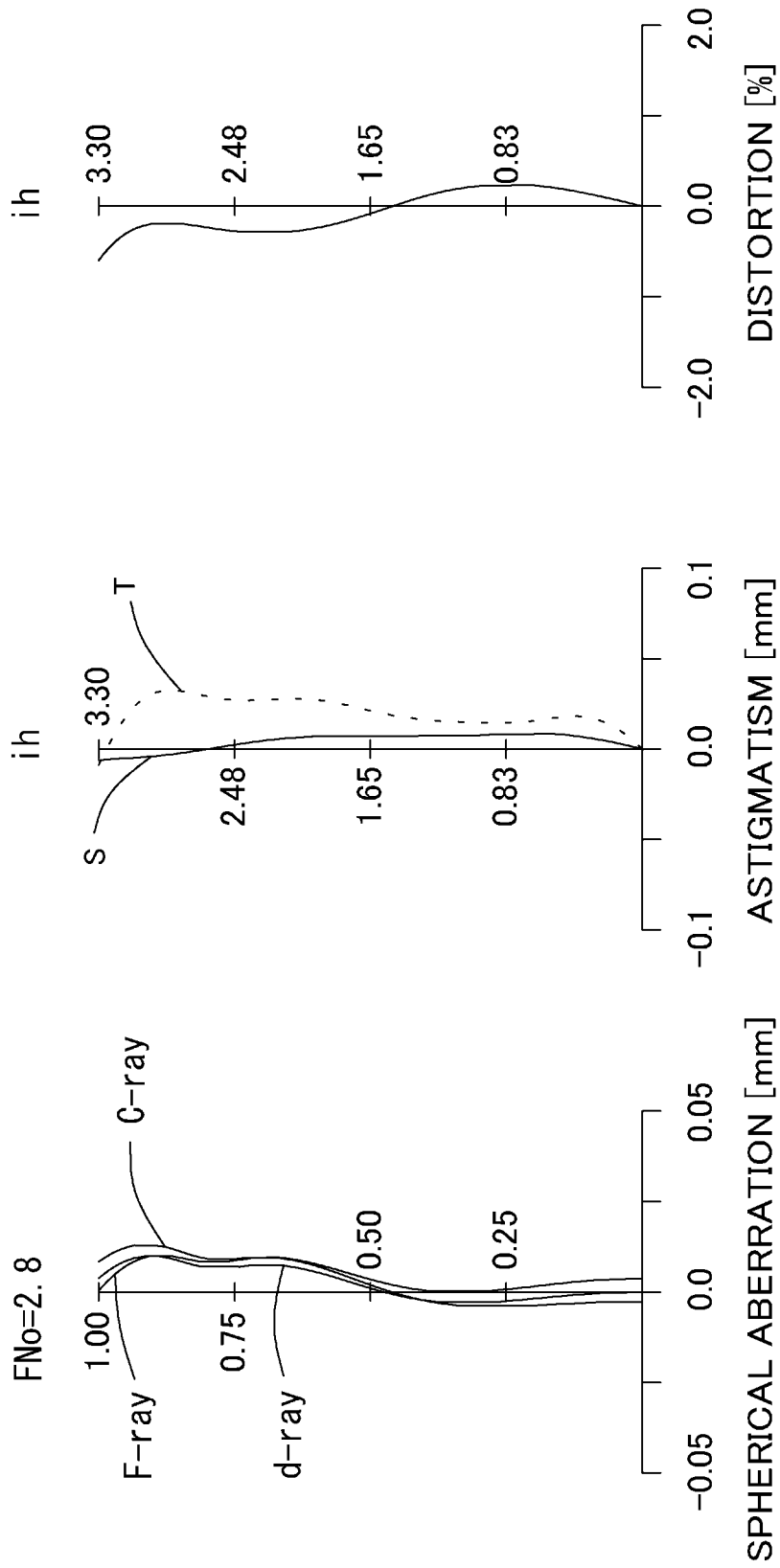
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S and on tangential image surface T, respectively (same as FIG. 4 and FIG. 6). As shown in FIG. 2, each aberration is corrected excellently.

Example 2

The basic lens data is shown below in Table 2.

Example2
Unit mm
f = 4.33
Fno = 2.1
ω(°) = 37.6
ih = 3.30
TTL = 8.65

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | 0.1000 | | |
| 2* | −17.7675 | 1.1347 | 1.544 | 55.57 (vd1) |
| 3* | −2.6530 | 0.4065 | | |
| 4* | 5.1539 | 0.4850 | 1.650 | 21.54 (vd2) |
| 5* | 2.5775 | 0.3290 | | |
| 6* | −12.0037 | 3.3265 | 1.535 | 55.66 |
| 7* | −1.6293 | 0.0500 | | |
| 8* | 1.6195 | 0.6161 | 1.650 | 21.54 (vd4) |
| 9* | 0.9547 | 1.3000 | | |
| 10 | Infinity | 0.6650 | 1.517 | 64.17 |
| 11 | Infinity | 0.4881 | | |
| Image Plane | Infinity | | | |

Constituent Lens Data

| Lens | Start Surface | Focal Length | | |
|---|---|---|---|---|
| 1 | 2 | 5.59 | Σd = | 6.35 |
| 2 | 4 | −8.56 | L3Rsag = | −1.83 |
| 3 | 6 | 3.17 | ED6 = | 5.40 |
| 4 | 8 | −5.63 | | |

Aspheric Surface Data

| | Second Surface | Third Surface | Fourth Surface | Fifth Surface |
|---|---|---|---|---|
| k | 0.000000E+00 | 9.293548E−01 | 1.113224E−02 | −3.117854E+00 |
| A4 | −2.729881E−02 | −5.186648E−02 | −1.494606E−01 | −8.868712E−02 |
| A6 | 1.895465E−03 | 3.615508E−02 | 4.861634E−02 | 3.025477E−02 |
| A8 | −1.812889E−02 | −2.226373E−02 | −1.239077E−02 | −7.676611E−03 |
| A10 | 1.353093E−02 | 7.685446E−03 | 1.596797E−03 | 1.243508E−03 |
| A12 | −5.432281E−03 | −1.388732E−03 | −1.216047E−04 | −8.707941E−05 |
| A14 | 2.264463E−05 | −2.772100E−06 | 1.147120E−06 | 4.543609E−09 |
| A16 | 0.000000E+00 | 0.000000E+00 | 0.000000E+00 | 0.000000E+00 |

| | Sixth Surface | Seventh Surface | Eighth Surface | Ninth Surface |
|---|---|---|---|---|
| k | 0.000000E+00 | −8.423574E−01 | −3.040480E+00 | −2.295416E+00 |
| A4 | 3.075017E−02 | 3.452781E−02 | −1.368847E−02 | −1.895370E−02 |
| A6 | −1.683571E−02 | −8.411410E−03 | −9.611829E−04 | 8.817792E−04 |
| A8 | 4.782995E−03 | 1.511467E−03 | 2.096578E−04 | 1.306055E−04 |
| A10 | −5.972026E−04 | −1.529317E−04 | −3.743564E−06 | −2.167075E−05 |
| A12 | 2.768492E−05 | 6.820812E−06 | −1.461607E−06 | 8.178798E−07 |
| A14 | 2.207716E−10 | −3.496293E−11 | 2.744112E−09 | −1.841091E−10 |
| A16 | 0.000000E+00 | 0.000000E+00 | 0.000000E+00 | 0.000000E+00 |

The imaging lens in Example 2 satisfies conditional expressions (1) to (21) as shown in Table 4.

Figure 4:
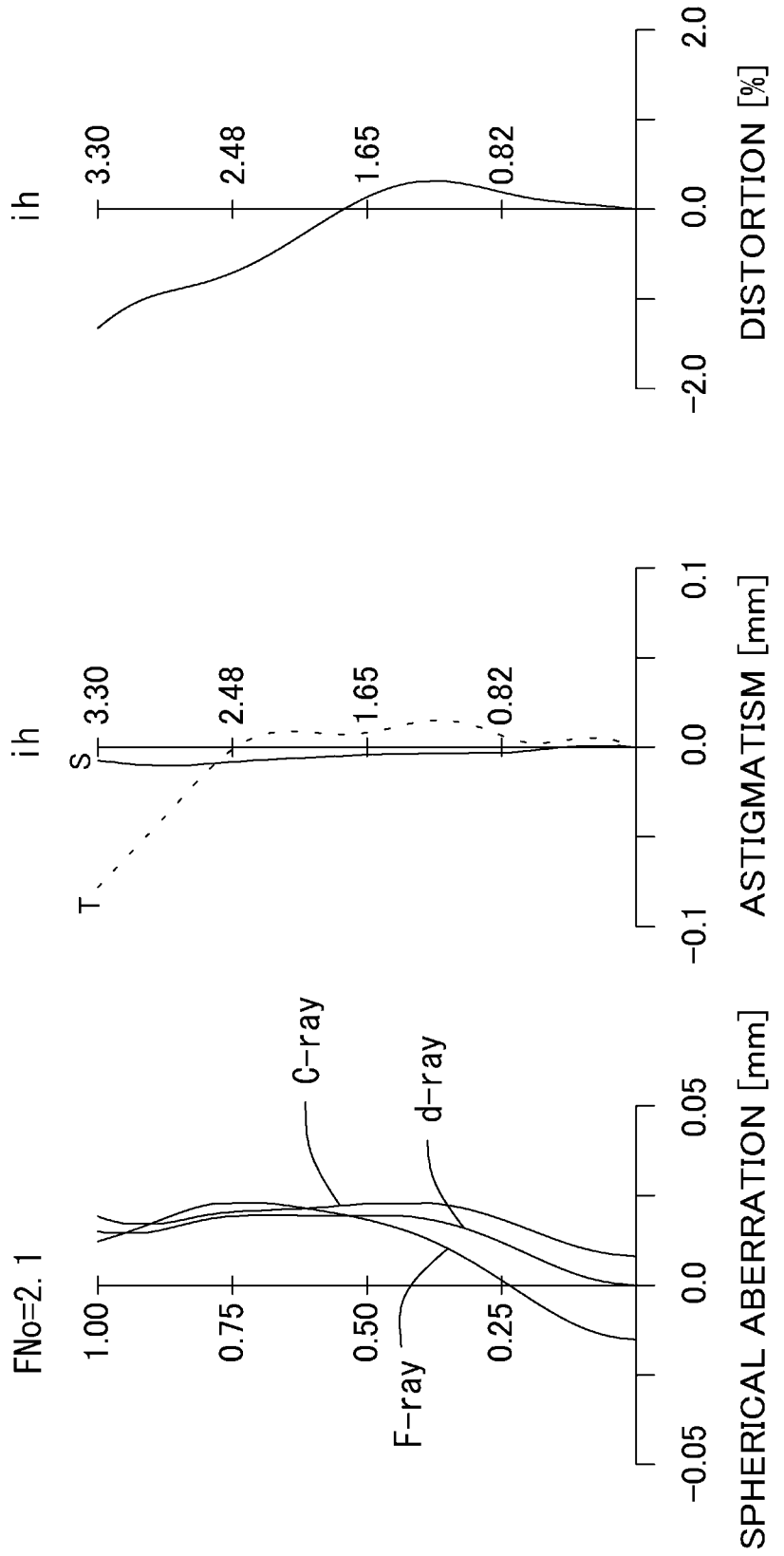
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

Example3
Unit mm
$f = 4.30$
$Fno = 2.8$
$\omega(°) = 37.7$
$ih = 3.30$
$TTL = 8.05$

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | 0.1000 | | |
| 2* | −6.2678 | 0.6522 | 1.544 | 55.57 (vd1) |
| 3* | −1.9577 | 0.7961 | | |
| 4* | −11.4379 | 0.5544 | 1.650 | 21.54 (vd2) |
| 5* | 6.9488 | 0.1692 | | |
| 6* | −6.1818 | 2.6632 | 1.535 | 55.66 |
| 7* | −1.4214 | 0.0500 | | |
| 8* | 2.1325 | 0.7907 | 1.650 | 21.54 (vd4) |
| 9* | 1.0880 | 1.3000 | | |
| 10 | Infinity | 0.6650 | 1.517 | 64.17 |
| 11 | Infinity | 0.5314 | | |
| Image Plane | Infinity | | | |

Constituent Lens Data

| Lens | Start Surface | Focal Length | | |
|---|---|---|---|---|
| 1 | 2 | 4.97 | $\Sigma d = 5.68$ | |
| 2 | 4 | −6.57 | $L3Rsag = −1.64$ | |
| 3 | 6 | 2.89 | $ED6 = 4.70$ | |
| 4 | 8 | −4.87 | | |

Aspheric Surface Data

| | Second Surface | Third Surface | Fourth Surface | Fifth Surface |
|---|---|---|---|---|
| k | 0.000000E+00 | −3.568617E−02 | 0.000000E+00 | 5.231460E+00 |
| A4 | −6.831700E−02 | −6.442670E−02 | −1.213829E−01 | −7.882346E−02 |
| A6 | −7.239842E−02 | −9.360713E−04 | 3.690383E−02 | 2.712146E−02 |
| A8 | −1.575512E−02 | −6.523585E−03 | −7.947931E−05 | −6.423773E−03 |
| A10 | 3.588831E−01 | 2.742324E−03 | −1.751293E−04 | 1.902222E−03 |
| A12 | −7.808087E−01 | −1.904307E−02 | −1.124709E−03 | −4.220861E−04 |
| A14 | 4.867046E−01 | 1.033722E−02 | 2.439569E−04 | 2.631703E−05 |
| A16 | 0.000000E+00 | 0.000000E+00 | 0.000000E+00 | 0.000000E+00 |

| | Sixth Surface | Seventh Surface | Eighth Surface | Ninth Surface |
|---|---|---|---|---|
| k | 0.000000E+00 | −9.215970E−01 | −6.540795E+00 | −3.259852E+00 |
| A4 | 4.289937E−02 | 4.353666E−02 | −1.385346E−03 | −1.866002E−02 |
| A6 | −2.677325E−02 | −1.235683E−02 | −5.059885E−03 | 1.602263E−03 |
| A8 | 1.110372E−02 | 2.186972E−03 | 9.792584E−04 | −1.054759E−05 |
| A10 | −2.302521E−03 | −1.711561E−04 | −7.775692E−05 | −1.474421E−05 |
| A12 | 2.375369E−04 | −1.038282E−05 | −9.586614E−07 | 9.863260E−07 |
| A14 | −1.490994E−05 | 1.913433E−06 | 1.624207E−07 | −1.457321E−08 |
| A16 | 0.000000E+00 | 0.000000E+00 | 0.000000E+00 | 0.000000E+00 |

The imaging lens in Example 3 satisfies conditional expressions (1) to (21) as shown in Table 4.

Figure 6:
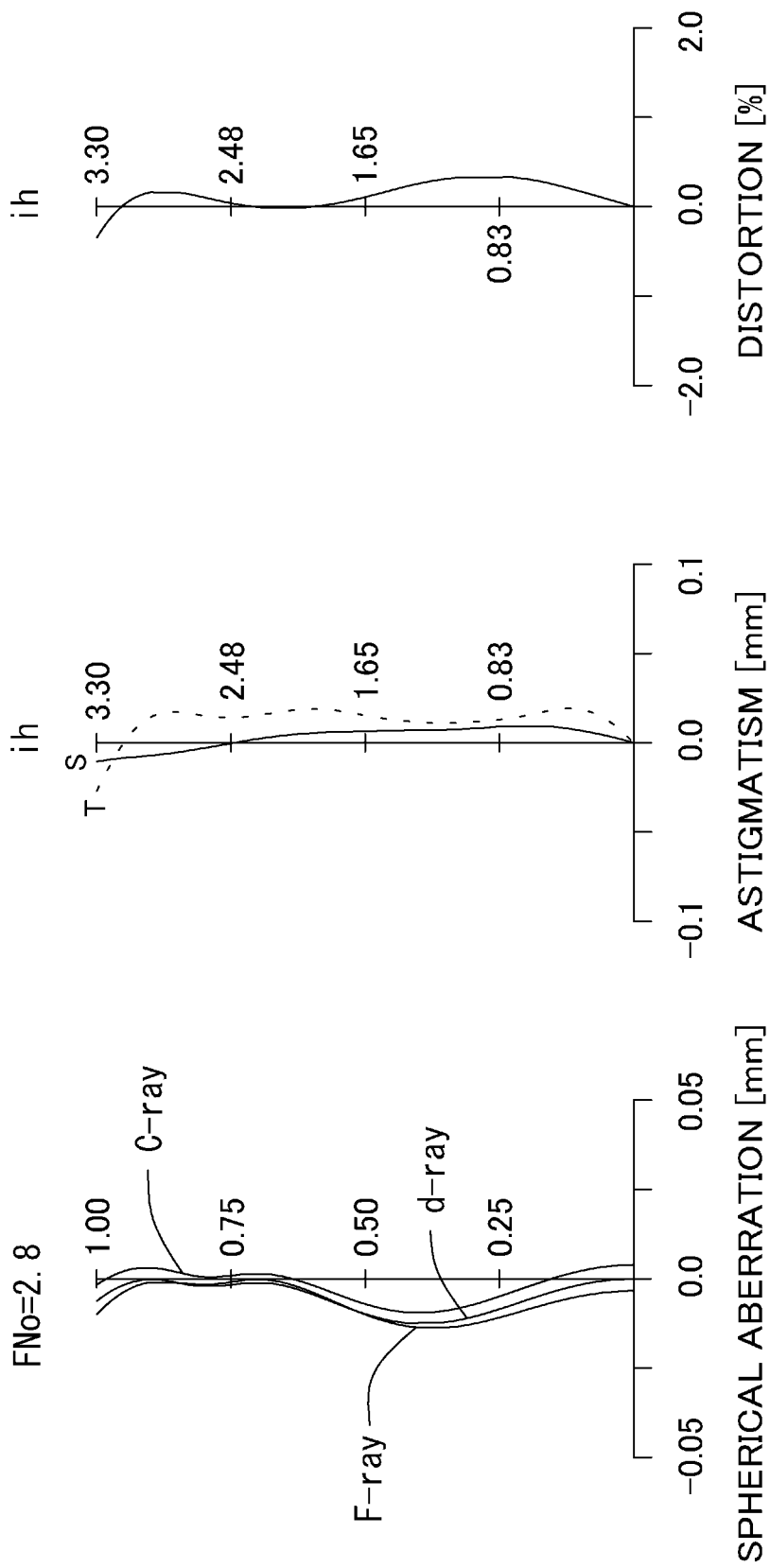
FIG. 6 shows spherical aberration, astigmatism, and distortion of the imaging lens in Example 3 according to the present invention.
Figure 7:
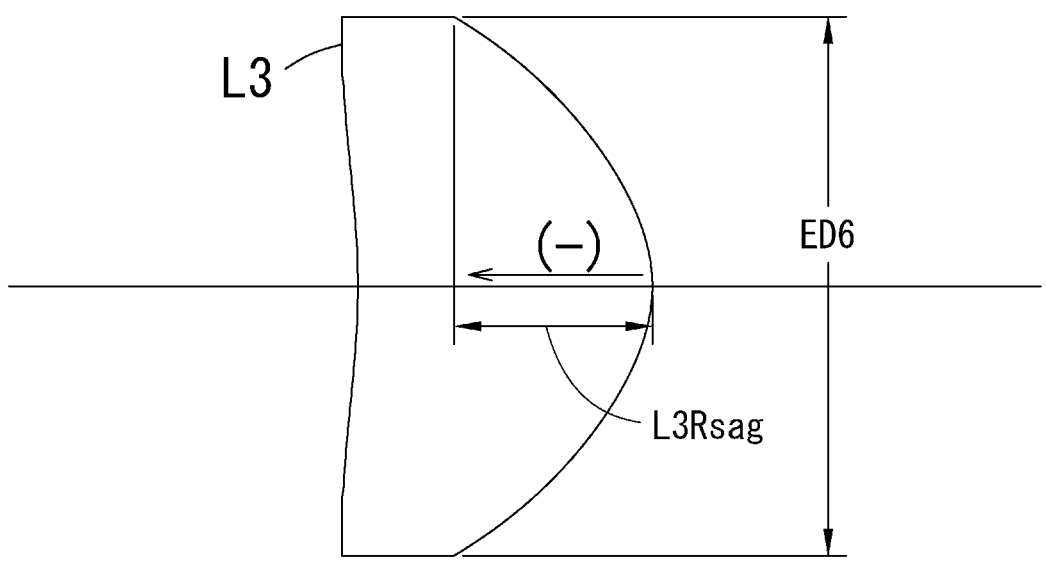
FIG. 7 illustrates an effective diameter ED6 of an image-side surface, and sag amount L3Rsag at an effective diameter edge of the third lens according to the present invention.

FIG. 6 shows spherical aberration (mm), astigmatism (mm), and distortion (%) of the imaging lens in Example 3. As shown in FIG. 6, each aberration is corrected excellently.

In table 4, values of conditional expressions (1) to (21) related to the Examples 1 to 3 are shown.

TABLE 4

| | Example1 | Example2 | Example3 |
|---|---|---|---|
| Conditional Expression (1) $\Sigma d/TTL$ | 0.69 | 0.73 | 0.71 |
| Conditional Expression (2) $|r5|/f$ | 1.33 | 2.77 | 1.44 |
| Conditional Expression (3) $f1/f$ | 1.16 | 1.29 | 1.16 |
| Conditional Expression (4) $vd1 - vd2$ | 34.03 | 34.03 | 34.03 |
| Conditional Expression (5) $vd4$ | 21.54 | 21.54 | 21.54 |
| Conditional Expression (6) $(T3/f)*100$ | 1.16 | 1.16 | 1.16 |

TABLE 4-continued

|  | Example1 | Example2 | Example3 |
|---|---|---|---|
| Conditional Expression (7) \|r3/r4\| | 1.33 | 2.00 | 1.65 |
| Conditional Expression (8) D3/f | 0.60 | 0.77 | 0.62 |
| Conditional Expression (9) f4/f | −1.15 | −1.30 | −1.13 |
| Conditional Expression (10) r2/f | −0.45 | −0.61 | −0.46 |
| Conditional Expression (11) D3/T2 | 17.63 | 10.11 | 15.74 |
| Conditional Expression (12) \|r5\|/r6 | −4.07 | −7.37 | −4.35 |
| Conditional Expression (13) r4/f | 1.76 | 0.60 | 1.62 |
| Conditional Expression (14) (r7 + r8)/(r7 − r8) | 3.10 | 3.87 | 3.08 |
| Conditional Expression (15) r2/\|r3\| | −0.19 | −0.51 | −0.17 |
| Conditional Expression (16) (T2/f)*100 | 3.42 | 7.60 | 3.94 |
| Conditional Expression (17) r7/f | 0.50 | 0.37 | 0.50 |
| Conditional Expression (18) f1/f3 | 1.72 | 1.76 | 1.72 |
| Conditional Expression (19) TTL/f | 1.87 | 2.00 | 1.87 |
| Conditional Expression (20) L3Rsag/ED6 | −0.36 | −0.34 | −0.35 |
| Conditional Expression (21) CRA | 24.35 | 23.58 | 23.43 |

When the imaging lens according to the present invention is applied to a product with camera function, there is realized contribution to wide field of view and also high performance thereof.

DESCRIPTION OF REFERENCE NUMERALS

ST: aperture stop,
L1: first lens,
L2: second lens,
L3: third lens,
L4: fourth lens,
IM: image plane

What is claimed is:

1. An imaging lens comprising, in order from an object side to an image side,
   a first lens having concave surface facing the object side and a convex surface facing an image side, the first lens having positive refractive power,
   a second lens having a concave surface facing the image side near an optical axis and negative refractive power,
   a third lens having the convex surface facing the image side and the positive refractive power, and
   a fourth lens being a meniscus lens having the convex surface facing an object side near the optical axis and having the negative refractive power, wherein said fourth lens is a double-sided aspheric lens and has a pole point at an off-axial position on the image-side surface, and below conditional expressions (1), (2) and (3) are satisfied:

$$0.5 < \Sigma d/TTL < 0.9 \tag{1}$$

$$0.7 < |r5|/f < 3.5 \tag{2}$$

$$1.0 \leq f1/f \tag{3}$$

where
Σd: distance along the optical axis from an object-side surface of the first lens to an image-side surface of the fourth lens,
TTL: total track length,
r5: curvature radius near the optical axis of the object-side surface of the third lens,
f1: focal length of the first lens, and
f: focal length of an overall optical system.

2. The imaging lens according to claim 1, wherein a conditional expression (6) below is satisfied:

$$0.5 < (T3/f) \times 100 < 2.0 \tag{6}$$

where
T3: distance along the optical axis from the image-side surface of the third lens to the object-side surface of the fourth lens, and
f: focal length of the overall optical system.

3. The imaging lens according to claim 1, wherein a conditional expression (7) below is satisfied:

$$1.0 < |r3/r4| < 4.2 \tag{7}$$

where
r3: curvature radius near the optical axis of the object-side surface of the second lens, and
r4: curvature radius near the optical axis of the image-side surface of the second lens.

4. The imaging lens according to claim 1, wherein a conditional expression (8) below is satisfied:

$$0.3 < D3/f < 0.9 \tag{8}$$

where
D3: thickness on the optical axis of the third lens, and
f: focal length of the overall optical system.

5. The imaging lens according to claim 1, wherein a conditional expression (9) below is satisfied:

$$f4/f < 0.8 \tag{9}$$

where
f4: focal length of the fourth lens, and
f: focal length of the overall optical system.

6. The imaging lens according to claim 1, wherein a conditional expression (5) below is satisfied:

$$20 < vd4 < 32 \tag{5}$$

where
vd4: abbe number at d-ray of the fourth lens.

7. The imaging lens according to claim 1, wherein a conditional expression (10) below is satisfied:

$$-1.4 < r2/f < -0.2 \tag{10}$$

where
r2: curvature radius near the optical axis of the image-side surface of the first lens, and
f: focal length of the overall optical system.

8. The imaging lens according to claim 1, wherein a conditional expression (11) below is satisfied:

$$8.0 < D3/T2 \tag{11}$$

where
D3: thickness on the optical axis of the third lens, and
T2: distance along the optical axis from the image-side surface of the second lens to the object-side surface of the third lens.

9. An imaging lens comprising, in order from an object side to an image side, a first lens having a concave surface facing the object side and a convex surface facing an image side, and positive refractive power, a second lens having a concave surface facing the image side near an optical axis and negative refractive power, a third lens having the convex surface facing the image side and the positive refractive power, and a fourth lens being a meniscus lens having the convex surface facing an object side near the optical axis and having the negative refractive power, wherein said fourth lens is a double-sided aspheric lens and has a pole point at an off-axial position on the image-side surface, and below conditional expressions (1), (4), (5) and (12) are satisfied:

$$0.5 < \Sigma d/TTL < 0.9 \qquad (1)$$

$$30 < vd1 - vd2 \qquad (4)$$

$$20 < vd4 < 32 \qquad (5)$$

$$-8.5 \leq r5 = /r6 < 3.0 \qquad (12)$$

where $\Sigma d$: distance along the optical axis from the object-side surface of the first lens to the image-side surface of the fourth lens, TTL: total track length, vd1: abbe number at d-ray of the first lens, vd2: abbe number at d-ray of the second lens, vd4: abbe number at d-ray of a fourth lens, r5: curvature radius near the optical axis of the object-side surface of the third lens, and r6: curvature radius near the optical axis of the image-side surface of the third lens.

10. The imaging lens according to claim 9, wherein a conditional expression (13) below is satisfied:

$$0.45 < r4/f < 4.0 \qquad (13)$$

where r4: curvature radius near the optical axis of the image-side surface of the second lens, f: focal length of the overall optical system.

11. The imaging lens according to claim 9, wherein a conditional expression (6) below is satisfied:

$$0.5 < (T3/f) \times 100 < 2.0 \qquad (6)$$

where

T3: distance along the optical axis from the image-side surface of the third lens to the object-side surface of the fourth lens, and f: focal length of the overall optical system.

12. The imaging lens according to claims 9, wherein a conditional expression (7) below is satisfied:

$$1.0 \leq r3/r4 = <4.2 \qquad (7)$$

where r3: curvature radius near the optical axis of the object-side surface of the second lens, and r4: curvature radius near the optical axis of the image-side surface of the second lens.

13. The imaging lens according to claims 9, wherein a conditional expression (8) below is satisfied:

$$0.3 < D3/f < 0.9 \qquad (8)$$

where

D3: thickness on the optical axis of the third lens, and f: focal length of the overall optical system.

14. An imaging lens comprising, in order from an object side to an image side, a first lens having a concave surface facing an object side and a convex surface facing an image side, and having positive refractive power, a second lens having a concave surface facing the image side near an optical axis and negative refractive power, a third lens having the convex surface facing the image side and the positive refractive power, and a fourth lens being a meniscus lens having the convex surface facing an object side near the optical axis and having the negative refractive power, wherein said fourth lens is a double-sided aspheric lens and has a pole point at an off-axial position on the image-side surface, and below conditional expressions (1) and (6) are satisfied:

$$0.5 < \Sigma d/TTL < 0.9 \qquad (1)$$

$$0.5 < (T3/f) \times 100 < 2.0 \qquad (6)$$

where $\Sigma d$: distance along the optical axis from the object-side surface of the first lens to the image-side surface of the fourth lens, TTL: total track length, T3: distance along the optical axis from the image-side surface of the third lens to the object-side surface of the fourht lens, and f: focal length of the overall optical system.

15. The imaging lens according to claim 14, wherein a conditional expression (2) below is satisfied:

$$0.7 < |r5|/f < 3.5 \qquad (2)$$

where r5: curvature radius near the optical axis of the object-side surface of the third lens, and f: focal length of the overall optical system.

16. The imaging lens according to claim 14, wherein a conditional expression (3) below is satisfied:

$$1.0 < f1/f \qquad (3)$$

where f1: focal length of the first lens, and f: focal length of the overall optical system.

17. The imaging lens according to claim 14, wherein a conditional expression (6) below is satisfied:

$$0.5 < (T3/f) \times 100 < 2.0 \qquad (6)$$

where

T3: distance along the optical axis from the image-side surface of the third lens to the object-side surface of the fourth lens, and f: focal length of the overall optical system.

18. The imaging lens according to claims 14, wherein a conditional expression (7) below is satisfied:

$$1.0 \leq r3/r4 = <4.2 \qquad (7)$$

where r3: curvature radius near the optical axis of the object-side surface of the second lens, and r4: curvature radius near the optical axis of the image-side surface of the second lens.

* * * * *